United States Patent
Gits et al.

(10) Patent No.: US 8,259,177 B2
(45) Date of Patent: Sep. 4, 2012

(54) VIDEO FINGERPRINT SYSTEMS AND METHODS

(75) Inventors: Peter M. Gits, Clarendon Hills, IL (US); Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 986 days.

(21) Appl. No.: 12/164,465

(22) Filed: Jun. 30, 2008

(65) Prior Publication Data

US 2009/0328125 A1    Dec. 31, 2009

(51) Int. Cl.
H04N 5/225    (2006.01)
(52) U.S. Cl. ......... 348/169; 382/103; 382/173; 725/105
(58) Field of Classification Search .................. 348/169; 382/173, 103; 725/105
See application file for complete search history.

(56) References Cited

U.S. PATENT DOCUMENTS

| | | | |
|---|---|---|---|
| 4,677,466 A | 6/1987 | Lert, Jr. et al. | |
| 4,952,928 A | 8/1990 | Carroll et al. | |
| 5,054,090 A | 10/1991 | Knight et al. | |
| 5,204,670 A | 4/1993 | Stinton | |
| 5,659,613 A | 8/1997 | Copeland et al. | |
| 6,002,499 A | 12/1999 | Corboline et al. | |
| 6,018,374 A | 1/2000 | Wrobleski | |
| 6,490,686 B1 | 12/2002 | Wheeler | |
| 7,394,916 B2 * | 7/2008 | Brodsky et al. | 382/103 |
| 2002/0069218 A1 | 6/2002 | Sull et al. | |
| 2002/0135695 A1 * | 9/2002 | Edelson et al. | 348/439.1 |
| 2002/0156743 A1 * | 10/2002 | DeTreville | 705/57 |
| 2002/0176025 A1 | 11/2002 | Kim et al. | |
| 2003/0067989 A1 | 4/2003 | Yoshinari | |
| 2005/0086682 A1 * | 4/2005 | Burges et al. | 725/19 |
| 2005/0172312 A1 * | 8/2005 | Lienhart et al. | 725/19 |
| 2006/0103732 A1 | 5/2006 | Bateman | |
| 2006/0187358 A1 | 8/2006 | Lienhart et al. | |
| 2006/0190776 A1 | 8/2006 | Oostveen et al. | |
| 2006/0195859 A1 | 8/2006 | Konig et al. | |
| 2006/0195860 A1 | 8/2006 | Eldering et al. | |

(Continued)

FOREIGN PATENT DOCUMENTS

WO    WO 98/50869 A1    11/1998
(Continued)

OTHER PUBLICATIONS

Non-final Office Action in U.S. Appl. No. 12/164,485 dated Nov. 8, 2010.

(Continued)

*Primary Examiner* — Abdullahi Salad
(74) *Attorney, Agent, or Firm* — Merchant & Gould

(57) ABSTRACT

A method that provides identification information for a portion of a video stream includes receiving a video stream, wherein the video stream includes one or more successive video scenes, wherein the one or more successive video scenes respectively corresponds to one or more sets of visual information, wherein each of the one or more successive video scenes includes plural successive pictures, wherein a first visual object is included in a first video scene, wherein the one or more successive video scenes includes the first video scene, detecting the first visual object over a first plurality of pictures of the first video scene, deriving information corresponding to one or more measured transitions of the first visual object over the first plurality of pictures of the first video scene, and providing identification information corresponding to the derived information.

18 Claims, 12 Drawing Sheets

U.S. PATENT DOCUMENTS

| | | | |
|---|---|---|---|
| 2006/0242667 A1 | 10/2006 | Petersen et al. | |
| 2006/0248569 A1 | 11/2006 | Linehart et al. | |
| 2006/0271947 A1 | 11/2006 | Lienhart et al. | |
| 2006/0291690 A1 | 12/2006 | Roberts | |
| 2007/0030818 A1 | 2/2007 | Bahnck et al. | |
| 2007/0153679 A1 | 7/2007 | Jost et al. | |
| 2007/0162873 A1* | 7/2007 | Haro et al. | 715/838 |
| 2007/0253594 A1 | 11/2007 | Lu et al. | |
| 2008/0019577 A1 | 1/2008 | Kim et al. | |
| 2008/0052783 A1* | 2/2008 | Levy | 726/26 |
| 2008/0062315 A1 | 3/2008 | Oostveen et al. | |
| 2009/0022400 A1* | 1/2009 | Matsuzaki | 382/190 |
| 2009/0154806 A1* | 6/2009 | Chang et al. | 382/173 |
| 2009/0327334 A1 | 12/2009 | Rodriguez et al. | |
| 2009/0328237 A1 | 12/2009 | Rodriguez et al. | |
| 2010/0002082 A1* | 1/2010 | Buehler et al. | 348/159 |
| 2010/0265390 A1* | 10/2010 | Zhang | 348/441 |
| 2010/0303366 A1* | 12/2010 | Zhang | 382/218 |
| 2010/0329547 A1 | 12/2010 | Cavet | |

FOREIGN PATENT DOCUMENTS

| | | |
|---|---|---|
| WO | WO 01/43440 A1 | 6/2001 |
| WO | WO 01/63774 A1 | 8/2001 |
| WO | 02065782 | 8/2002 |
| WO | WO 2006/101979 A2 | 9/2006 |

OTHER PUBLICATIONS

U.S. Appl. No. 12/164,521, filed Jun. 30, 2008 entitled "Matching of Unknown Video Content to Protected Video Content", inventors: Rodriguez et al.

U.S. Appl. No. 12/164,485, filed Jun. 30, 2008 entitled "Generating Measures of Video Sequences to Detect Unauthorized Use", inventors: Rodriguez et al.

Chang et al., "VideoQ: An Automated Content Based Video Search System Using Visual Cues", Proceedings ACM Multimedia, Nov. 1997, vol. Conf. 5, pp. 313-324.

Dimitrova et al., Motion Recovery for Video Content Classification:, ACM Transactions on Information Systems, NY, vol. 13 No. 4, Oct. 1995, pp. 408-439.

Aghbari et al., "Content-Trajectory Approach for Searching Video Databases", IEEE Transactions on Multimedia, IEEE Service Center, NJ, vol. 5 No. 4, Dec. 2003, pp. 516-531.

Kim et al., "Image and Video Signature Techniques", Joint Video Team (JVT) of ISO/IEC MPEG & ITU-T VCEG, Oct. 2006, pp. 1-9.

PCT Written Opinion Appl. No. PCT/US2008/071111 dated Jan. 5, 2009.

PCT Written Opinion Appl. No. PCT/US2009/049200 dated Sep. 8, 2009.

International Search Report dated Jan. 5, 2009 cited in International Application No. PCT/US2008/071111.

International Search Report dated Sep. 8, 2009 cited in International Application No. PCT/US2009/049200.

"Cuba Introduces Video Fingerprint Filtering," Jul. 27, 2006, retrieved from the Internet on Jun. 27, 2008 at http://www.drmwatch.com/drmtech/article.php/3623091.

"6.4 Canny's Edge Detection," retrieved from the internet on Jun. 27, 2008 at http://www.ii.metu.edu.tr/~ion528/demo/lectures/6/4/index.html.

Guo, et al., "Video Object Fingerprinting for Confirmatory Identification (CID)," retrieved from the internet on Jun. 27, 2008 at http://www.dodsbir.net/sitis/view_pdf.asp?id=08_paper.pdf.

Fhgigd, et al., "Automating Production of Cross Media Content for Multi-Channel Distribution," retrieved from the internet on Jun. 27, 2008 at http://www.axmedis.org/documenti/view_documenti.php?doc_id=1422.

"Video Fingerprinting," retrieved from the internet on Jun. 27, 2008 at http://www.business-sites.philips.com/assets/Downloadablefile/Videofingerprinting_5-13507.pdf.

Loubna Bouarfa, "Research Assignment on Video Fingerprinting," Dec. 2006, Information and Communication Theory Group Faculty of Electrical Engineering, Mathematics, and Computer Science, Delft University of Technology.

Sunil Lee and Chang D. Yoo, "Robust Video Fingerprinting Based on Affine Covariant Regions," Div. of EE, School of EECS, KAIST, 373-1 Guseong Dong, Yuseong Gu Daejeon 305-701, Republic of Korea.

Final Office Action in U.S. Appl. No. 12/164,485 dated Mar. 25, 2011, 18 pages.

Non-final Office Action in U.S. Appl. No. 12/164,521 dated Mar. 23, 2011, 16 pages.

* cited by examiner

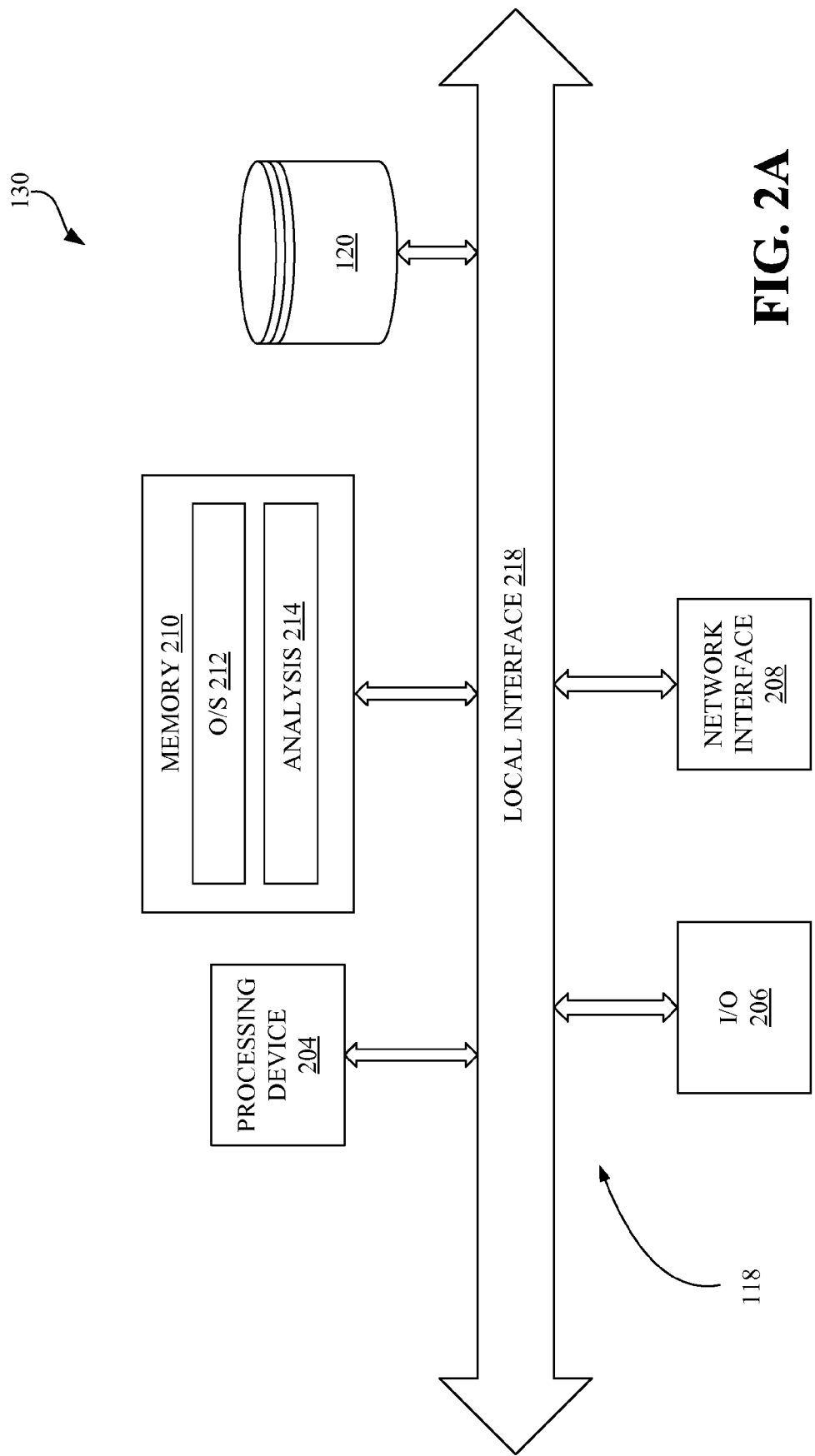

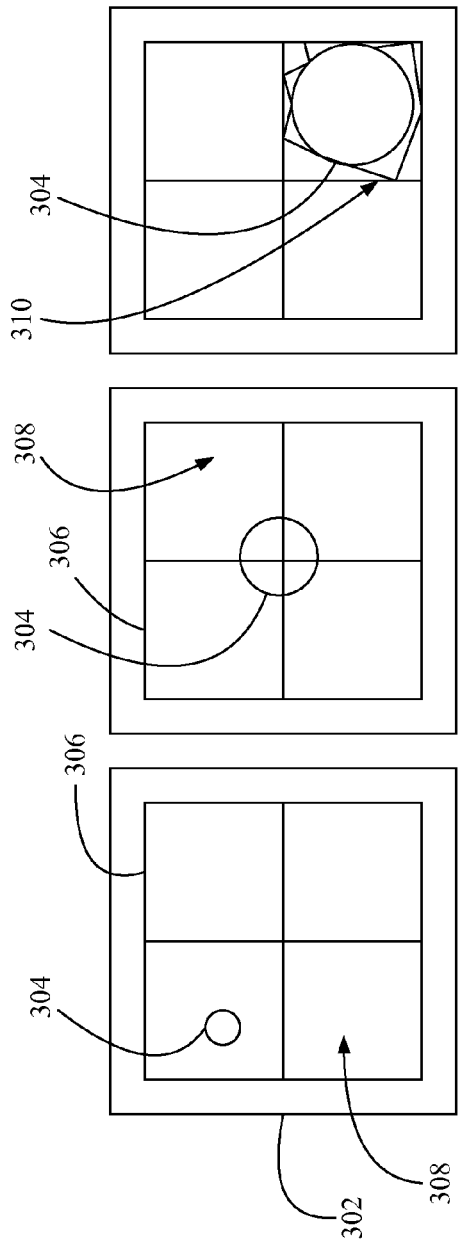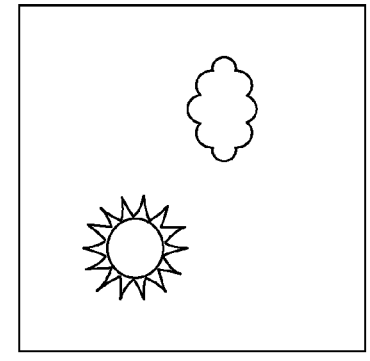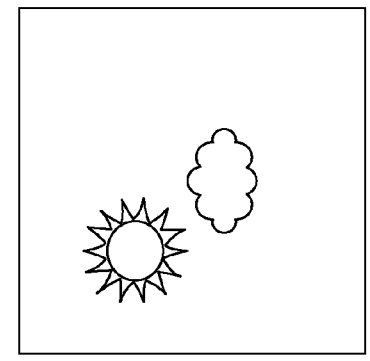

VIDEO FINGERPRINT SYSTEMS AND METHODS

CROSS REFERENCE TO RELATED APPLICATIONS

This application is related to commonly assigned U.S. utility patent applications entitled "Generating Measures of Video Sequences to Detect Unauthorized Use," and accorded Ser. No. 12/164,485, and "Matching of Unknown Video Content to Protected Video Content," and accorded Ser. No. 12/164,521, both of which are filed on the same date as the present application and both of which are entirely incorporated herein by reference.

TECHNICAL FIELD

The present disclosure is generally related to video, and, more particularly, is related to systems and methods for identifying unlawful use of protected video content.

BACKGROUND

Currently across the Internet, video files are copied every day and uploaded to web-sites like YouTube, Google, etc. The amount of such video sharing sites is growing substantially, furthering the risk of violation of digital rights (e.g., copyright) pertaining to the video clips. Organizations like the Motion Picture Association, Major League Baseball, or any entity or person that owns the rights to video content has an interest in protecting those rights. In addition, video sharing sites may also seek to be more compliant as the restrictions for service providers become more significant to offering non-copyrighted material, especially if penalties for illegally distributing copyrighted material become more onerous.

Techniques today include injecting a tag (e.g., watermarks) into a video stream, the tag providing an indication of the source of the video. However, tags can be cleansed, resulting in the proliferation of further copies of the video across web sites without the tag, providing obstacles to tracking by owners of the video. Further, other measures can be used to circumvent such tags by, for instance, cropping portions of the video, among other techniques.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A is a block diagram of an embodiment of a device configured to derive a video fingerprint from a video sequence.

FIGS. 3A-3C are schematic diagrams that illustrate an example of various objects that exhibit measurable transitions within a video sequence.

FIGS. 4A-4C are schematic diagrams that illustrate another example of various objects that exhibit measurable transitions within a video sequence.

DESCRIPTION OF EXAMPLE EMBODIMENTS

Overview

Figure 1:
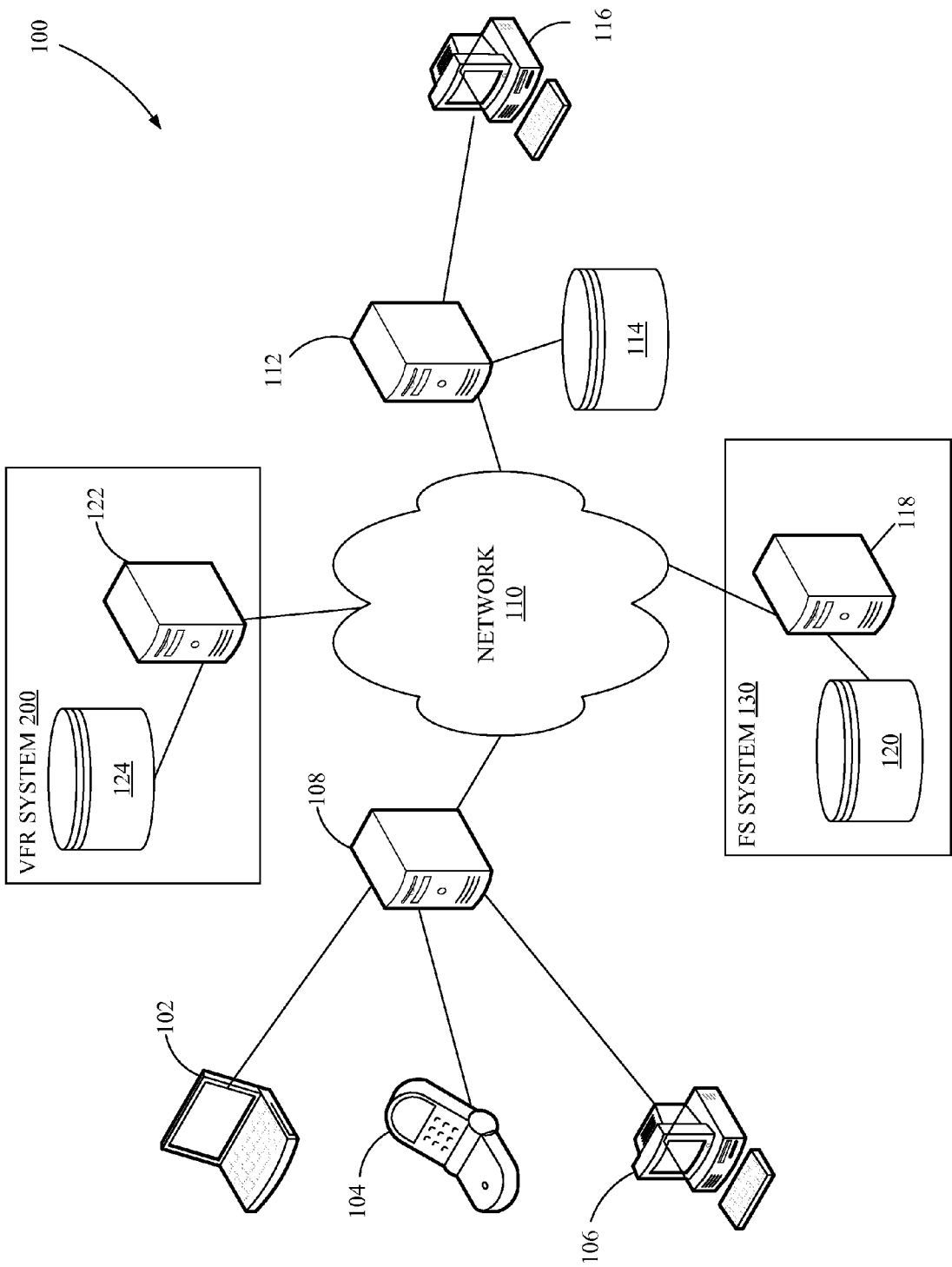
FIG. 1 is a block diagram that illustrates an example environment in which video fingerprint (VF) systems and methods can be implemented.

In one embodiment, a method that provides identification information for a portion of a video stream includes receiving a video stream, wherein the video stream includes one or more successive video scenes, wherein the one or more successive video scenes respectively corresponds to one or more sets of visual information, wherein each of the one or more successive video scenes includes plural successive pictures, wherein a first visual object is included in a first video scene, wherein the one or more successive video scenes includes the first video scene, detecting the first visual object over a first plurality of pictures of the first video scene, deriving information corresponding to one or more measured transitions of the first visual object over the first plurality of pictures of the first video scene, and providing identification information corresponding to the derived information.

EXAMPLE EMBODIMENTS

Disclosed herein are various embodiments of video fingerprint systems and methods (herein, collectively referred to also as video fingerprint (VF) systems and methods). Such VF systems enable certain entities responsible for the storage and/or provision of video files across networks to monitor the transfer of video files and identify violations of digital rights or otherwise unlawful use of protected content.

A video fingerprint (also referred to herein as a measure or signature or identification information) uniquely characterizes a video sequence (plural pictures or frames) from a movie (e.g., broadcast, on-demand, etc.) or program (e.g., sports program, news program, documentary, sitcom, etc.) or other video content based on one or more object transitions. In one embodiment, video fingerprints are derived on a scene-by-scene basis (hence characterizing object transitions for each scene), though in some embodiments not necessarily derived for every scene (video scene, including plural successive pictures, including first and second pictures where the second picture follows the first picture in display order) of a movie or program. Further, the video fingerprint may encompass object transitions that last for less than an entire scene (yet persist for a predetermined threshold, as explained below).

Herein, a video sequence that spans less than or equal to an entire scene is also referred to as a video snippet. A single video fingerprint may be derived from transitions pertaining to a single object (e.g., visual object) for a video snippet, or from multiple object transitions for a video snippet. Although a single video fingerprint may be derived per scene, in some embodiments, multiple video fingerprints may be derived per scene (e.g., in instances where video fingerprints are derived on a per object transition, per scene basis, and multiple video fingerprints are derived, such as to validate or bolster certainty of the video fingerprints). In one embodiment, a video fingerprint is embodied as an equation that represents a measure of one or more object transitions. In other words, a video fingerprint conveys quantifiable information about object transitions. In some embodiments, a video fingerprint may be embodied in other forms, such as a data structure, numerical value, etc. Object transitions are defined over an interval of time, where the interval of time includes absolute time or relative time (e.g., differences in presentation time stamps (PTS), differences in counter value, time relative to scene changes, time relative to commencement of transitions for a particular object, etc.), as well as a time duration as measured by the passing of pictures or frames or fields. Object transitions include quantifiable changes in object features over time, such as changes in shape, color, hue, size, etc. Object transitions also include quantifiable changes in movement or motion of an object, such as motion relative to identified objects and/or picture boundaries.

Having described some of the terminology used in the present disclosure, an example implementation that can benefit from VF systems as disclosed herein is described below. For instance, users may upload all or part of a copyrighted video to an Internet website for unlawful sale and/or distribution to other users. When received by the video file sharing server for uploading to the website, the video file sharing server may be configured with VF system logic that derives or generates one or more video fingerprints of the video sequence. Once derived, the video fingerprints can be forwarded to a video fingerprint repository system that comprises one or more data structures (e.g., database of records) of reference video fingerprints extracted from known, protected (e.g., copyrighted) video content. The forwarded video fingerprints are compared to the stored reference video fingerprints, and if a match is found between the video fingerprint(s) derived by the video file sharing server and the reference video fingerprints stored in the database, a communication may be sent back to the video file sharing server alerting the associated service provider of the match so that appropriate measures may be taken, such as to avoid penalties for enabling the unlawful distribution or sale of such protected content. Other implementations and variations of the above are contemplated, and the example above merely serves to provide an illustration of how VF systems and methods can benefit video file sharing environments.

In the description that follows, an example environment (e.g., FIG. 1) in which VF systems may be employed is described as well as embodiments of devices (e.g., FIGS. 2A and 5A) that employ one or more components and methods (e.g., FIGS. 2B, 5B-5E, 6 and 7) of VF systems. Illustrations of some types of object transitions that can be measured are shown in, and described in association with, FIGS. 3A-4C. It should be understood that, although certain embodiments are described in the context of the example environment shown in FIG. 1, other environments that share, transfer, process, and/or distribute video files are contemplated to be within the scope of the embodiments.

FIG. 1 is a schematic diagram of an example environment, a communication network 100, in which video fingerprint (VF) systems and methods can be implemented. The communication network 100 may include a plurality of individual networks, such as a wireless network and/or a wired network. The communication network 100 includes a plurality of client devices 102, 104, 106, and 116 (e.g., wired and/or wireless devices, such as cellular phones, personal digital assistants (PDAs), computer devices or systems such as laptops, personal computers, set-top terminals, televisions with communication capabilities, DVD/CD recorders, etc.,) that are in communication with one or more client servers, such as client servers 108 or 112. The client servers 108 and 112 are coupled to a network, such as a wide area network (WAN) 110, which in one embodiment comprises the Internet. Other networks are contemplated to be within the scope of the disclosure, including networks that use packets incorporated with other transport protocols or standards. The client servers 108 and 112 may also comprise, or be in local communication with, one or more storage devices, such as shown with client device 112 and corresponding storage device 114. Communication between the client server 108 and the client devices 102, 104, 106 (and likewise, client server 112 and client device 116) may be via wireless or wired connections, including by way of non-limiting example Ethernet, token ring, private or proprietary networks, among others. A video file sharing system (denoted in FIG. 1 as FS system) 130 and video fingerprint repository (VFR) system 200 are also included in communication network 100, each coupled to the network 110. The video file sharing system 130 comprises one or more servers 118 and one or more storage devices 120 configured to receive and store video content (e.g., for uploading to websites). The VFR system 200 comprises one or more servers 122 and one or more storage devices 124, the storage device 124 configured to store data structures (e.g., a database of records) corresponding to reference video fingerprints associated with known, protected video content.

Client servers 108 and 112 may comprise a server in an Internet Service Provider (ISP) facility, a private server, a gateway, and/or other devices or facilities used for communication of video files (among other content, such as data, audio, etc.). One having ordinary skill in the art should understand that additional client servers and client devices and other devices, such as routers, bridges, etc., may be employed in the communication network 100. Communication of Internet Protocol (IP) packets between the client devices 102, 104, 106, 116, the respective client servers 108 and 112, and system servers 122 and 118 may be implemented according to one or more of a plurality of different protocols, such as user datagram protocol (UDP)/IP, transmission control protocol (TCP)/IP, among others.

The system server 118 of the video file sharing system 130 comprises logic (e.g., one or more modules of code, hardware, or a combination of both) that analyzes video sequences (e.g., comprising one or more video snippets) received from the client servers 108 and 112 and derives (generates) one or more video fingerprints (including deriving information corresponding to one or more measured transitions) for comparison with reference video fingerprints stored in the VFR system 200. In some embodiments, functionality of the logic for analyzing video sequences and generating video fingerprints can reside elsewhere in the network 100 (in place of or in addition to residing in the system server 118), such as at client servers 108 and 112.

As explained above, the VFR system 200 comprises a server 122 coupled to a storage device or repository 124. The server 122 comprises logic (e.g., one or more modules of code, hardware, or a combination of both) configured to evaluate whether video fingerprints received from the system server 118 match reference video fingerprints (e.g., based on known protected content) stored in the storage device 124. In addition, the system server 122 comprises logic configured to derive (generate) reference video fingerprints for storage in the storage device 124. It should be understood that storage and data structures corresponding to the storage device 124 may be an external storage devices or, in some embodiments, be physically incorporated into the server 122, or in some embodiments, distributed throughout the network (e.g., mirrored at the file sharing system 130). Further, it should be understood that in some embodiments, functionality residing in the system server 122 may reside in the system server 118 of the video file sharing system 130 (or elsewhere), whereby evaluation may be implemented, for instance, local to the provider of the file sharing capabilities. Although shown using a single server 122, the VFR system 200 may comprise in some embodiments one or more server devices (e.g., mainframe, personal computer, gateway, etc.) and/or one or more additional repositories 124.

FIG. 2A is a block diagram of an embodiment of the video file sharing system 130 shown in FIG. 1, which includes the system server 118 and storage device 120. Generally, in terms of hardware architecture, the system server 118 includes a processing device 204, input/output (I/O) devices 206, network interface 208, and memory 210, each of which is communicatively coupled via a local interface 218. The network interface 208 includes devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

The I/O devices 206 may include input devices, for example but not limited to, a keyboard, mouse, scanner, microphone, etc. Furthermore, the I/O devices 206 may also include output devices, for example but not limited to, a printer, display, etc.

The local interface 218 can be, for example but not limited to, one or more buses or other wired or wireless connections, as is known in the art. The local interface 218 may have additional elements, which are omitted for simplicity, such as controllers, buffers (caches), drivers, repeaters, and receivers, to enable communications. Further, the local interface 218 may include address, control, and/or data connections to enable appropriate communications among the aforementioned components. The video file sharing system 130 is further configured with the storage device 120 coupled to the local interface 218, the storage device 120 configured to store video content uploaded by the client servers 108 and 112. Although one storage device 120 is shown, there may be plural storage devices in some embodiments.

The processing device 204 is a hardware device for executing software, particularly that which is stored in memory 210. The processing device 204 can be any custom made or commercially available processor, a central processing unit (CPU), an auxiliary processor among several processors associated with the system server 118, a semiconductor-based microprocessor (in the form of a microchip or chip set), a macroprocessor, or generally any device for executing software instructions.

The memory 210 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 210 may incorporate electronic, magnetic, optical, and/or other types of storage media. Note that the memory 210 can have a distributed architecture, where various components are situated remotely from one another, which can be accessed by the processing device 204.

The software in memory 210 may include one or more separate programs, each of which comprises an ordered listing of executable instructions for implementing logical functions. In the embodiment shown in FIG. 2A, the software in the memory 210 includes a suitable operating system (O/S) 212 and an analysis module 214. The operating system 212 essentially controls the execution of other computer programs, such as the analysis module 214, and provides scheduling, input-output control, file and data management, memory management, and communication control and related services.

Functionality of the analysis module 214 may be implemented using a single module, or distributed among a plurality of modules. The analysis module 214 comprises functionality to receive and analyze decompressed video sequences (e.g., decompression performed in one embodiment by decompression functionality (e.g., MPEG, H.264, etc.) incorporated in the processing device 204 or by a separate decoder (not shown), or in some embodiments, the analysis module may incorporate decompression functionality), and derive video fingerprints from one or more object transitions in the received video sequences for transmission to the VFR system 200 to be compared to reference video fingerprints.

When the analysis module 214 is in operation, the processing device 204 is configured to execute software stored within the memory 210, to communicate data to and from the memory 210, and to generally control operations of the analysis module 214 pursuant to the software. The analysis module 214 and the O/S 212, in whole or in part, but typically the latter, are read by the processing device 204, perhaps buffered within the processing device 204, and then executed.

Figure 2B:
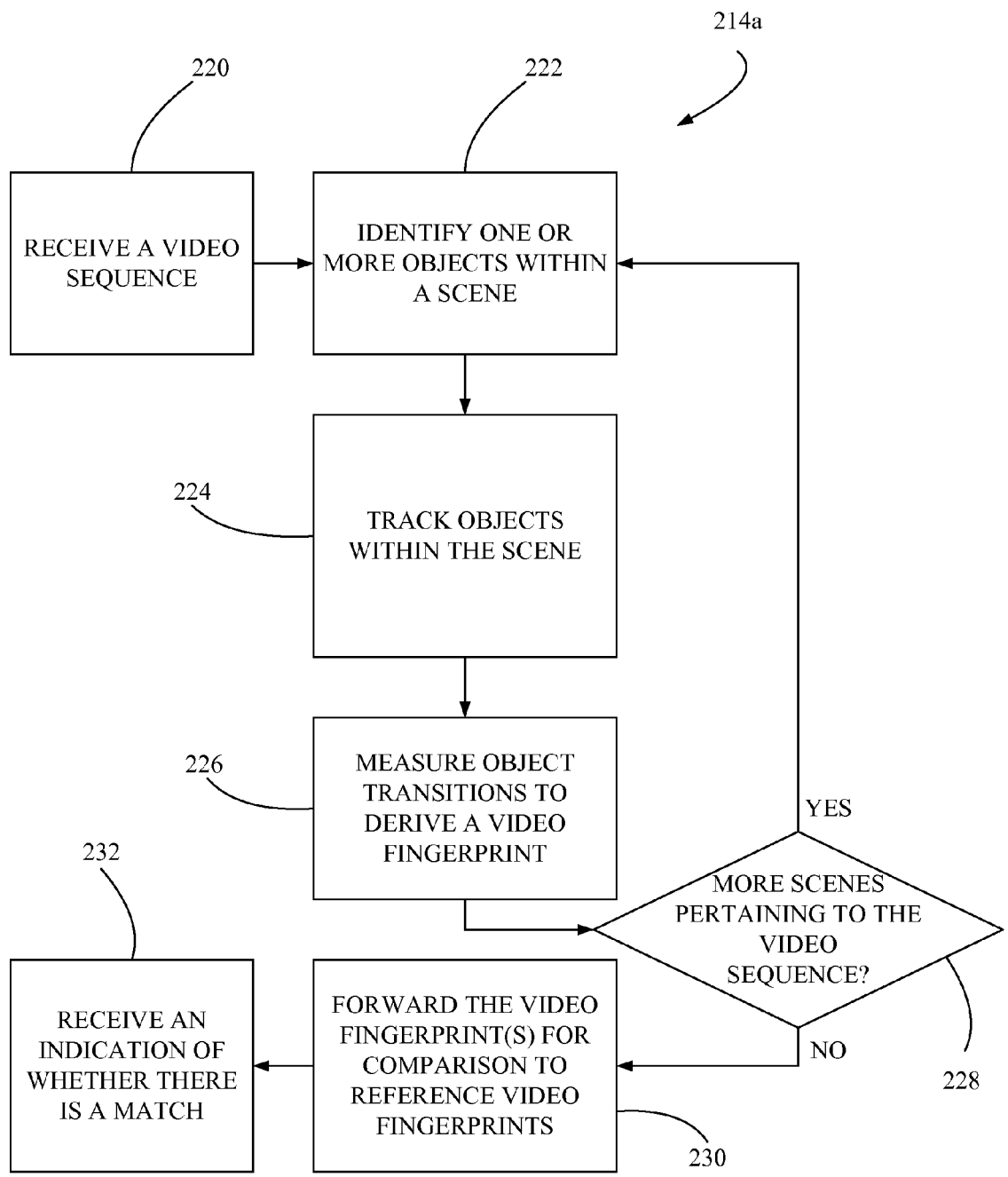
FIG. 2B is a flow diagram that illustrates an embodiment of a method for deriving a video fingerprint.

Having described an embodiment of a video file sharing system 130 and associated components, attention is directed to FIG. 2B, which is a flow diagram that illustrates an example analysis method (denoted with reference numeral 214*a*) implemented in one embodiment by the analysis module 214 in cooperation with other components of the system server 118, such as the network interface 208 and processing device 204. The analysis method 214*a* receives a video sequence (220). For instance, a user may nefariously record via a client device (e.g., a DVD recorder) a pay-per-view event and through known mechanisms (e.g., browser software) upload the recording to the client server 108, which then uploads the content to the video file sharing system 130 (or in some implementations, uploading may occur directly from the client device to the file sharing system 130).

The analysis method 214*a* identifies or detects one or more objects (visual objects) with a scene (222). Various mechanisms are well-known (e.g., from computer vision arts, medical imaging arts, etc.) for identifying objects, such as defining bounding boxes, finding closed borders, finding connected objects, segmenting the object defined by the bounding box, orienting the object to the principle axis with respect to the origin, determining the object dimensions with respect to the picture dimensions (e.g., the picture dimensions provided in the video stream, such as a picture header in MPEG-2 or sequence or picture parameter set of AVC), computing invariant shape descriptors (e.g., Fourier descriptors) and centroids (and/or the first and second principle axes) and the corresponding intersection of the centroid (and/or axes), performing edge detection (e.g., Canny edge detector, among other well-known edge detection mechanisms), etc. One or more of these well-known methods can be implemented by the analysis method 214*a* (or in some embodiments, implemented in cooperation with other dedicated logic) to identify one or more objects. Note that in one embodiment, feature identification is part of the object identification in (222). Features such as object shape, color, hue, shading, size, etc. may change over a span of a scene (or less than a scene), and accordingly the corresponding object is worthy of tracking within a scene.

The analysis method 214a further comprises tracking the one or more objects within the scene (224). For instance, the objects can be tracked by their centroids or invariant shape descriptors, though not limited to these parameters (e.g., tracking can be based on these and/or other features or parameters of an object). The analysis method 214a tracks objects over a window of time defined by, for instance, number of frames, picture relative time (e.g., ΔPTS), or at defined time increments. The window of time may correspond to an entire scene or less than the entire scene. In one embodiment, the analysis method 214a tracks the video sequence on a scene-by-scene basis, the change in scene detected using well-known mechanisms (e.g., in conjunction with the disappearance of all objects, fade or slide effects, absence of correlation between pictures, etc.). In some embodiments, class objects can be graded or ranked throughout the tracking process. For instance, each time a new object persists in a scene for more than a defined window of time (e.g., 3-5 seconds), the object is upgraded as a higher-level class object within the current scene and is coupled to or correlated with objects that have already been identified.

Note that in some embodiments, a limiting filter may be applied by the analysis method 214a, such as to limit the tracking exclusively to moving objects versus stationary objects and hence limit the number of objects to track. In some embodiments, global motion techniques may be used to separate camera panning from object motion.

The analysis method 214a further comprises measuring object transitions to derive a video fingerprint (226). The analysis method 214a may filter out some objects that are less robust to detection-circumvention techniques. In one embodiment, objects are ranked by the analysis method 214a according to their robustness to detection-circumvention techniques, or based on other criteria (e.g., ease of tracking, certainty or confidence in measurement, etc.). For instance, an object that has tracked along or near the periphery of a picture may be of lower priority (e.g., versus an object located at or near the center of the picture) in view of the relative ease at which border objects may be cropped (e.g., to avoid detection of protected content). Accordingly, some objects may be excluded from object transition measurement by virtue of the object having a lower priority than a predetermined priority rank or value. As another example, the analysis method 214a selects for measurement object transitions associated with objects that appear for at least a defined threshold of time or number of frames (or said differently, excludes from measurement transitions corresponding to visual objects that appear for less than a predetermined window of time). In another example, object transitions may be measured exclusively using I pictures (e.g., objects persisting among a plurality of I pictures) in view of their higher fidelity and extended propagation of information maintained regardless of the degradation of the image. In general, n out of m objects (where n<m) may be selected for measurement of associated transitions, where n identified objects all possess a confidence measure of greater than a predefined value, K.

As explained above, a video fingerprint may comprise an equation (or in some embodiments, a data structure or value representing the equation or data structure) that represents one or more object transitions (or more specifically, represents information corresponding to measured object transitions), the equation conveying information like whether the object is moving up, down, left, or right, whether the object is increasing or decreasing in size, the transition duration (e.g., in absolute or relative time, number of frames, etc.). In other words, the equation is formulated to define the (measured) transitions of the object (e.g., transitions in features) over a defined window of time. In some implementations, the object transitions may not be represented by a finite equation, but rather, by an equation representing patterns with a level of deviation.

The measurement of object transitions comprises first ($1^{st}$) order functions of ΔT (change in time), and hence can be considered without relevance to absolute locations in a video clip (making the process of matching, described below, more robust, for example, to bogus frame or picture injection). Note however that in some embodiments the absolute locations may be relevant to the video fingerprint as well. In some embodiments, second ($2^{nd}$) order measurements (e.g., acceleration of an object or objects within a scene) can be implemented by the analysis method 214a. Such second order measurements provide differences between first order measurements, making the VF system more robust to hackers and other unscrupulous characters.

Note that the object transitions from which a video fingerprint is derived can be measured based on the entire scene or a video snippet having a duration less than the entire scene (e.g., 1-2 seconds). For instance, video fingerprints can be derived upon object transitions meeting or exceeding a defined time window referenced from a scene transition or transition commencement if not at the start of the scene change, or in terms of ΔPTS, or number of frames, and/or meeting or exceeding a defined percentage transition (change) in features and/or motion, and then a new video fingerprint is created for the next video snippet corresponding to the next sequential scene (whether lasting an entire scene or a portion thereof). Stated differently, some object transitions may be excluded from measurement in view of the fact that the object may not have persisted (e.g., the object may have appeared momentarily) a defined or predetermined threshold time or number of frames. In one embodiment, each video snippet is associated with various parameters or keys, such as a unique identifier pertaining to a movie or program (or other content instance), a scene number, and/or a sequence number pertaining to the order of the video snippet within a movie or program. Such parameters or keys may be incorporated into the video fingerprint, or associated with the fingerprint in known manner (e.g., using pointers or other types of reference mechanisms).

The analysis method 214a determines whether there are more scenes remaining to the received video sequence (228), and if so, repeats the processing starting at (222); otherwise, the analysis method 214a forwards the video fingerprint (or video fingerprints if the process is repeated for more scenes) to the VFR system 200 for comparison to reference video fingerprints stored therein (230).

Subsequently, the analysis method 214a receives an indication (from the VFR system 200) of whether there is a match between the video fingerprints derived by the analysis method 214a and reference video fingerprints stored at the VFR system 200. In some embodiments, the absence of an indication is understood by the analysis method 214a to mean that there is not a match of video fingerprints (e.g., no protected content corresponding to the video fingerprint sent to the VFR system 200). The indication that there is protected content may be via transmission of a set bit or flag, among other mechanisms to convey information well-known to one having ordinary skill in the art.

Note that in some embodiments, reference video fingerprints may be mirrored (e.g., copies downloaded from a central storage) to storage 120 or memory local to system server 118 of the file sharing system 130, enabling local evaluation (when equipped with evaluation logic, explained further below) of whether there is a match or not.

In some embodiments, additional processing may be imposed on the objects prior to measurement. For instance, all objects may be normalized to a defined picture resolution.

Attention is directed to FIGS. 3A-4C, which are schematic diagrams that conceptually illustrate object transitions that may be measured or fingerprinted. FIG. 3A shows a display 302 (e.g., computer monitor, TV screen, etc.) with an image of an object 304 (e.g., a ball) relative to another object 306 (e.g., a window frame), the window frame comprising four quadrants (e.g., top-left, top-right, bottom-left, bottom-right) corresponding to four panes of glass 308. The ball 304 is seen through the window pane corresponding to the top-left quadrant. FIG. 3B shows that the ball 304 has advanced closer to the window frame 306, as represented by the ball 304 at the intersection of the window frame 306 and the larger perceived size of the ball. FIG. 3C shows that the ball 304 has crashed through the window pane in the lower-right hand quadrant, as represented by the broken glass section 310 and the ball surrounded by the remaining glass in the section 310. From the scene revealed through FIGS. 3A-3C, it is noted that the analysis method 214a can measure various object transitions, such as the motion of the ball 304 as it translates across the scene (e.g., relative to picture boundaries), as well as motion of the ball relative to the window frame (another object). In other words, the measurement of spatial offsets from picture boundaries and other objects, from a start to an end (with respect to time or number of frames) comprises some of the measurable object transitions in this example shown in FIGS. 3A-3C. Note that in the process of measurement at the scene start (FIG. 3A) and scene end (FIG. 3C), intervals in between are also defined by equation (e.g., the trajectory characterized, for instance, as a slope or vector, or measurements are taken at plural defined increments throughout the scene) such that video snippets less than an entire scene may be matched later regardless of the techniques used to circumvent the detection process, as described below. In addition, the size of the ball 304 "expands" (providing the perception of advancing proximity the window frame 306), and hence beginning and ending area of the ball can also be measured over the span of the scene. Another transition pertains to the direction of the ball, also a quantifiable transition. Note that the illustrations of FIGS. 3A-3C are merely a simplification for understanding the concepts of the VF systems (e.g., a ball translating from one quadrant of a screen to another may involve hundreds of pictures).

Note that various attempts to circumvent the protected content detection mechanisms of the VF systems disclosed herein face difficult challenges. For instance, if the first frame represented in FIG. 3A is culled or dropped from the sequence (or every other frame, for instance), the missing frame will not circumvent detection since time stamps still reflect the relative motion within the scene, as do slopes, vectors, or other measures embodied in the equation and/or comparisons in the matching process to measurements taken during plural time increments within the scene that evade a culling process. In other words, in MPEG-2 video, for instance, time stamps are retained despite the dropping of pictures. Further, in view of the retained direction (vector) of the ball despite the dropped picture, and in view of the same post-dropped picture-to-ending spatial offsets (e.g., spatial coefficients) with respect to picture dimensions and relative to other objects and the same post-dropped picture-to-ending dimensions of the ball, a threshold percentage match is attainable. Further, the analysis method 214a is immune to deliberately-imposed picture scale changes in view of the measurement of relative motion or scale change. For instance, picture scale changes result in a proportional changes to the object, and hence relative changes in the size of the ball 304 will proportionally change with a picture scale change. As another example, given the measurement of distance of the object relative to picture dimensions, if a video sequence is originally formatted according to high definition (HD), and is subsequently transcoded to standard definition (SD), transitions of the object (e.g., the object dimensions defined by width, height of object) relative to the changed picture dimensions should be proportionate, and hence such attempts (transcoding) to circumvent the VF system should fail. Second order measurements, such as acceleration of the ball may also be taken to add certainty to the first order measurements.

FIGS. 4A-4C conceptually illustrate the relative motion between two objects in a display 402, namely that of a cloud 406 moving further from the sun 404 as the frames advance. Once again, spatial offsets during a time corresponding to the duration of all or part of a scene are measured with respect to picture dimensions and objects. Further, second order measurements may also be taken.

Figure 5A:
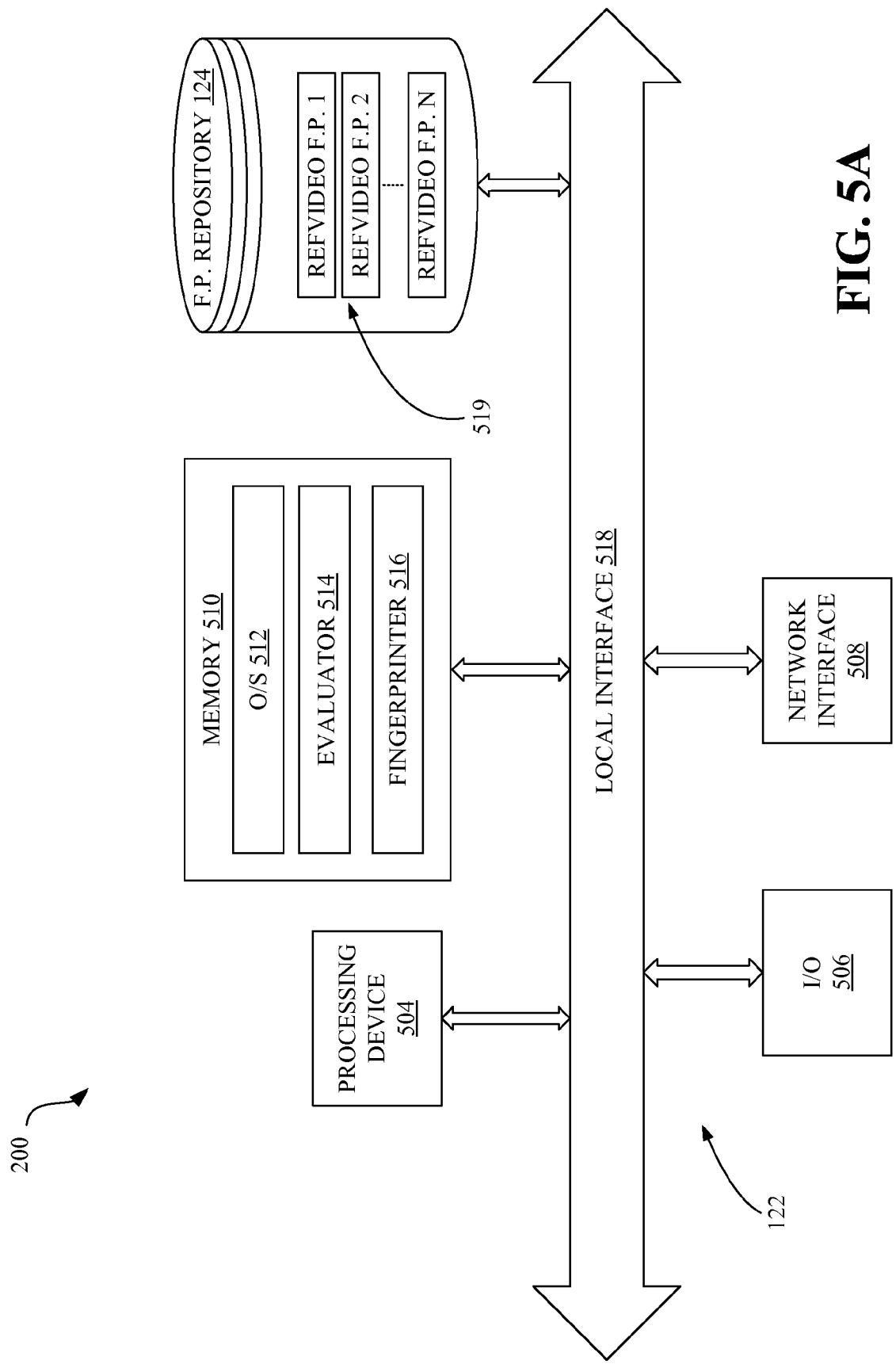
FIG. 5A is a block diagram that illustrates an embodiment of a device configured to generate and store reference video fingerprints and evaluate whether a video fingerprint matches a stored reference video fingerprint.

Having described an example architecture and functionality of an embodiment of a file sharing system 130 equipped with an analysis module 214, attention is directed to the VFR system 200 as shown in FIG. 5A. The VFR system 200 comprises a processing device 504, memory 510 (comprising an O/S 512), I/O device 506, and network interface 508 coupled to one another via a local interface 518. These components 504, 510, 512, 506, 508, and 518 are similar to the components of the same label having reference numerals 204, 210, 212, 216, 218, and 218 shown in FIG. 2A (and hence operate with the same or similar functionality), and hence discussion of the same is omitted here for brevity. The memory 510 further comprises an evaluator module 514 and a fingerprinter module 516.

In addition, the VFR system 200 further comprises a reference video fingerprint repository (or storage device)124 that is configured to store reference video fingerprints (e.g., refvideo f.p. 1, refvideo f.p. 2, ... refvideo f.p. N) as records or other data structures in a database 519, among other information as described further below. Although one reference video fingerprint repository 124 is shown, in some embodiments, a plurality of reference video fingerprint repositories may be implemented. In some embodiments, the corresponding video content (or a reference to the same) from which the reference video fingerprint is derived may also be stored in the database 519 or as part of a separate database or storage device that facilitates reference to the corresponding reference video fingerprint(s). As explained above, in some embodiments, the video file sharing system 130 can be equipped with this additional logic (e.g., evaluator module 514, fingerprinter module 516, reference video fingerprint repository 124) to enable, for instance, local evaluation and/or reference video fingerprinting and storage.

Figure 5B:
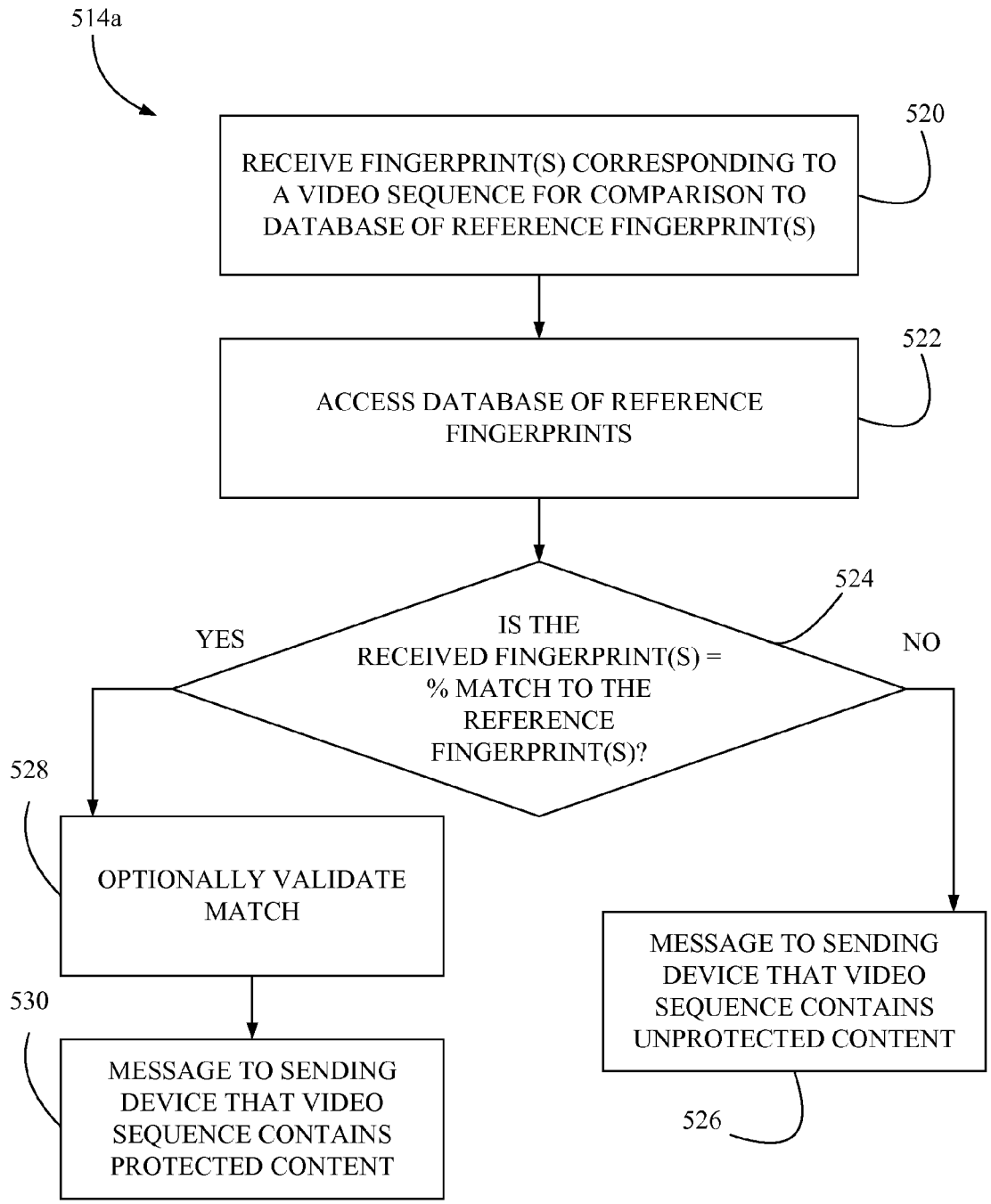
FIG. 5B is a flow diagram that illustrates an embodiment of a method for evaluating whether a video fingerprint matches a stored reference video fingerprint.

The evaluator module 514 is configured in one embodiment to implement a method, denoted evaluator method 514a and shown in FIG. 5B, to determine whether there is a match between the video fingerprint(s) (e.g., unknown content) received from the video file sharing system 130 and a stored reference video fingerprint(s) (known protected content). The evaluator method 514a may be performed off-line (time-delayed, for instance at a delayed time pre-upload to a website or afterwards), in-line (e.g., real-time), or a combination of both. As shown in FIG. 5B, the evaluator method 514a receives a video fingerprint or video fingerprints (520). For instance, the evaluator method 514a receives the video fingerprints from the file sharing system 130. The evaluator method 514a accesses the database 519 (e.g., of reference video fingerprints) of the video fingerprint repository 124 (522). Although described as a database, it should be understood that other data structures can be used in addition to, or in lieu of, the database in some embodiments. Further, though described as a single database, it should be understood in the context of the present disclosure that plural databases may be used.

In one embodiment, the database 519 is configured with a set of keys (not shown in FIG. 5A) that may be used as an index or shortcut to the stored reference video fingerprints. Such keys may be parameters of the video sequence (e.g. movie identifier, scene number, etc.) that are initially stored in the data repository 124 as part of the fingerprinting process (described below) and used to facilitate matching (during the evaluation process) of video fingerprints received by the video file sharing system 200. For instance, such keys may be received and parsed by the evaluator method 514a (e.g., in 520), and used for comparison to like keys residing in the database 519. For instance, a video fingerprint received by the video file sharing system 200 may embody one or more keys in the video fingerprint, or in some embodiments, be separate (e.g., not part of the equation) from the video fingerprint yet referenced to or associated with the video fingerprint. Such keys can be parsed at the VFR system 200 and matched to keys in the database 519 to facilitate the matching of received video fingerprints with reference video fingerprints stored in the database 519. The keys may further comprise subcategory indexes that include one or more of the following:

Range of objects found;
Spatial coefficients (dimensionality between objects (start));
Spatial coefficients (dimensionality between objects (end));
Area of total objects (start);
Area of total objects (end);
Snippet (video sequence) time length; and
Time stamps.

Additional information included in the same or different data structure (e.g., table) of the database 519 includes one or more of the following:

Reference video fingerprint in the format of an equation or data structure (e.g., the equation or data structure representing a quantifiable object relationship to all other objects identified within a scene over a period of time);
Percentage increase (scale) of the object;
Percentage decrease (scale) of the object;
An indication of whether the object disappears; and
An indication of whether the objects has a duration (is present) over a defined time or event (number of frames) window.

Note that such keys may be combined (or in some embodiments, omitted), such as for example a key comprising "% increase—start-size-end size" that, when indexed in the database 519, returns an array of matches corresponding to the combined key. It should be understood that other database configurations and search/match mechanisms well known to those having ordinary skill in the art are contemplated to be within the scope of the embodiments.

The evaluator method 514a determines whether the received video fingerprint(s) comprise a match to the reference video fingerprints stored in the database 519 (524). Since attempts to circumvent the detection mechanisms employed by the VF systems disclosed herein may alter or omit certain frames of a video sequence, the match may be based on anywhere from a total match (100%) to some defined threshold percentage (less than 100%) match between video fingerprints. For instance, the reference and received video fingerprints may differ in the number of objects detected in a cropped image, though the spatial offsets between the objects remain the same and objects that are not cropped remain the same and possess the same transition attributes. In addition, with regard to scaling of the video to attempt to avoid detection mechanisms, the objects may be of smaller (or larger) size, but the relative distance should remain the same. That is, the individual movements of objects through a scene should be identical (e.g., directionality, increase/decrease in size, etc.). Likewise, additions of unrelated video or deletions of segments of a scene should not interfere with the matching process (524), since not all of a scene needs to match for the video fingerprint to be identified as protected content. Further, a video sequence possessing several scenes undergoes this matching process through the several scenes, hence enabling a percentage of matches to be ranked for the entire subset.

In short, the VF systems disclosed herein take advantage of the fact that the objects in a scene follow the same transitions or path regardless of when observation or monitoring of the scene is initiated. By analogy, the matching process performed by the evaluator method 514a can be likened to a map of destinations versus direct matching (though direct matching may occur in some implementations), similar to how someone would drive to Florida from Illinois—it does not matter if tracking is commenced in Kentucky and is terminated in Atlanta, since the same travel stops are traversed. Similarly, it does not matter where in a scene tracking is commenced, since some possible matches are detected.

Note that spurious matches are addressed by the evaluator method 514a based on the assumption of a sequential order to each scene. As explained above, each object within a scene is tracked in conjunction with other objects and their relative offsets. The evaluator method 514a operates under the assumption that when a match is found within a particular time window, the percentage of certainty is raised when the following video sequence exhibits a high probability of matching as well. Such spurious match considerations can be implemented at (528).

Note that spurious match considerations can be mimicked in some implementations. For instance, consider a case where a movie camera is focused on a TV screen that is displaying a movie, and assume the "shot" fills the entire frame. Parts of the movie should match the actual movie except there should be different movement other than the surrounding TV screen in the "shot." Hence, the process (524) should enable matching or partial matching of the movie within the movie.

Responsive to determining there is no match, the evaluator method 514a optionally provides a message to the device that sent the video fingerprint (e.g., the system server 118) that indicates or suggests that the video sequence does not contain protected content (526). For instance, the indication may be a text message such as "the transmitted video fingerprint(s) reveal no protected content," or the message may be a flag that is set at a zero when there is no match, or the absence of a response from the evaluator method 514a may imply or suggest to the system server 118 that no matches were found (and hence no protected content revealed by the video fingerprint(s)). Other indicating mechanisms well known to one having ordinary skill in the art are contemplated to be within the scope of the disclosure.

Responsive to determining there is a match, the evaluator method 514a may optionally perform a second matching to boost or validate the certainty of the match (528). For instance, separate color channels may be used in some embodiments to solidify or validate the match, such as on a Y-plane, U and V planes, and/or on RGB planes. In some embodiments, voice tracks can be used to validate the match. In some embodiments, the absence of a match using these validating mechanisms (e.g., color and/or voice) may be used to exclude content outright (from the match process) or as a mechanism to downgrade the certainty factor of the initial match. In alternative embodiments, the validating mechanisms may be used as a preliminary culling factor before matching (524).

The evaluator method 514a provides a message to the sending device (e.g., the system server 118) indicating or suggesting to the client server (e.g., the analysis module 214) that the evaluated video fingerprint corresponds to protected content (530). For instance, the message may be in the format of as flag that is set, which represents or conveys to the system server 118 that protected content has been detected. In some embodiments, the message may be in the format of text or other formats that conveys explicitly that protected content has been detected.

Figure 5C:
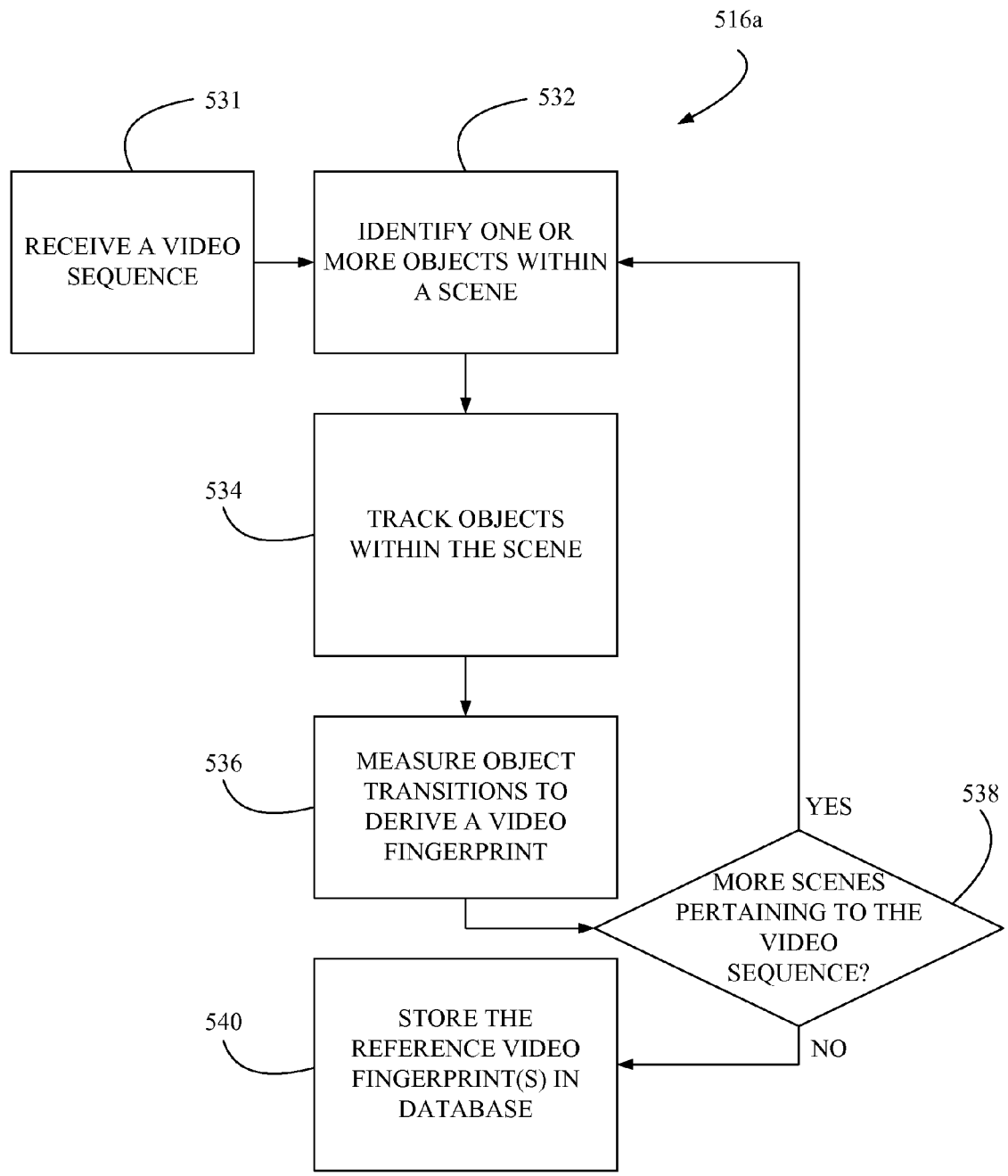
FIG. 5C is a flow diagram that illustrates an embodiment of a method for generating and storing a reference video fingerprint.

Having described the analysis and evaluation features of embodiments of a VF system, attention is directed to a reference video fingerprinting method that generates reference video fingerprints for storage in the reference video fingerprint repository 124. In particular, FIG. 5C illustrates an embodiment of a reference video fingerprinting method, denoted method 516a, and described below. In one embodiment, the reference video fingerprinting method 516a is implemented by the fingerprinter module 516 of the VFR system 200, though not limited to implementation by the fingerprinter module 516. For instance, in some embodiments, one or more of the functionality of the fingerprinter module 516 may be implemented at other locations in the network 100. In some embodiments, functionality of the fingerprinter module 516 may be implemented at computing devices associated with content providers that seek to upload video fingerprints (versus the VFR system 200 deriving the fingerprints from video content or sequences provided by the content provider) to the VFR system 200. The process illustrated by the reference video fingerprinting method 516a is similar to the analysis method 514a, and hence similar steps or logic in the process are not elaborated upon where described previously for the method 214a.

As shown in FIG. 5C, the video fingerprinting method 516a receives a video sequence (531), such as from a provider of protected content. The video fingerprinting method 516a identifies one or more objects within a scene (532), tracks the one or more objects within the scene (534), and measures object transitions corresponding to one or more of the tracked objects to derive or generate one or more reference video fingerprints per scene (536).

Note that the object transitions from which a video fingerprint is derived can be based on the entire scene or a video snippet having a duration less than the entire scene (e.g., 1-2 seconds). For instance, video fingerprints can be derived upon an object or objects persisting for a defined time window (ΔPTS, number of frames) and/or meeting or exceeding a defined percentage transition (change) in features and/or motion, and then a new record for the video (e.g., based on detection of a new scene) can be created in the database 519 for the next video snippet. As explained above, each video snippet corresponding to the protected content can be associated with various parameters or keys, such as a unique identifier pertaining to a movie or program (or other content instance), a scene number, and/or a sequence number pertaining to the order of the video snippet within the movie or program. Such parameters can be used to determine sequential sustainability. As explained above, such keys can be parsed out by the fingerprinter module 516 (or elsewhere) from the received reference video snippet and used as an index in the repository 124 to the associated video fingerprint.

If additional scenes (e.g., among a sequence of scenes of the same video which is the subject of the video fingerprinting) are present (538), then processing returns to (532) until no more scenes of the subject video are present (538), after which the reference video fingerprints are stored (with or without keys) in a database 519 residing in the reference video fingerprint repository 124.

Figure 5D:
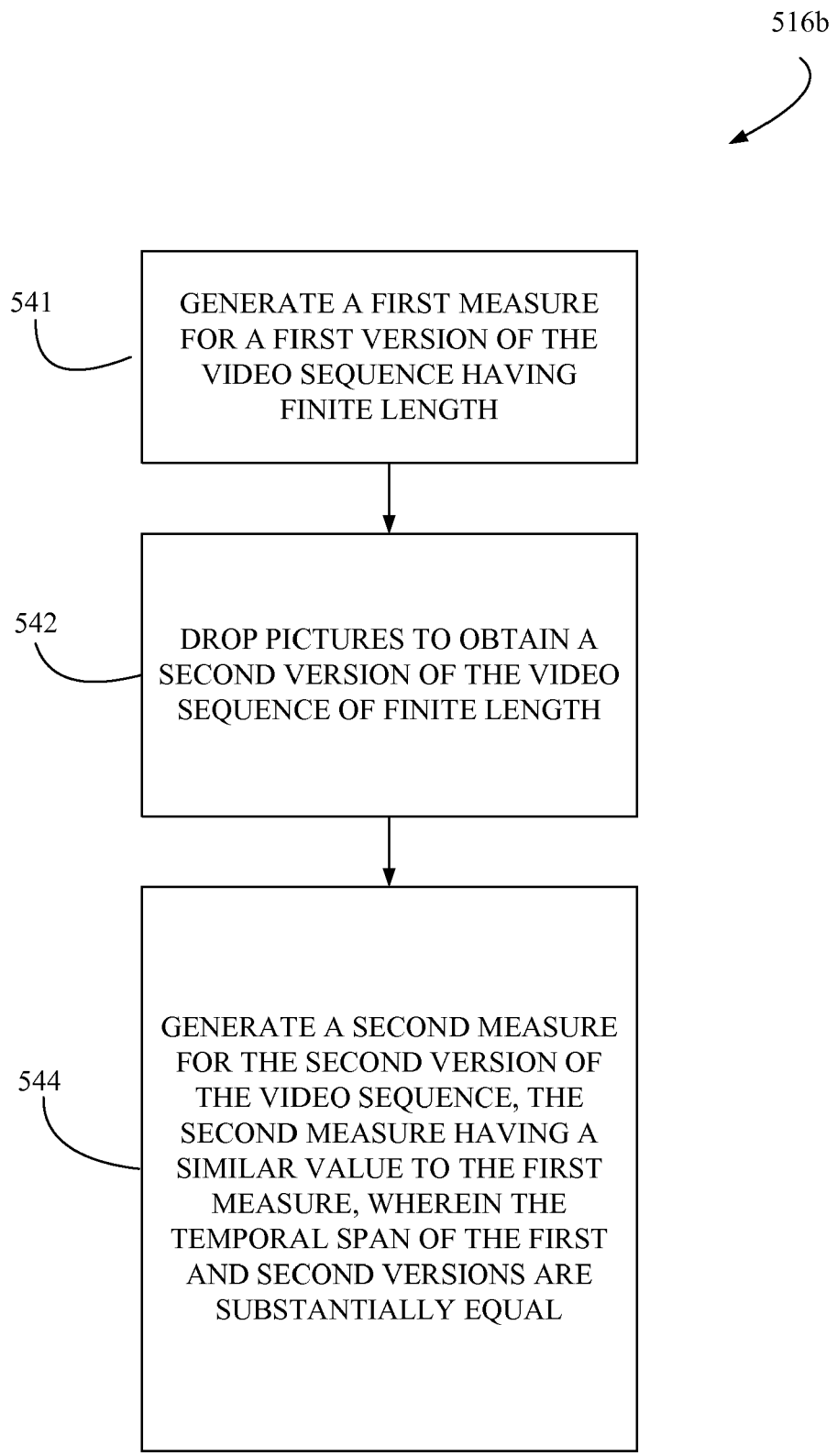
FIG. 5D is a flow diagram that illustrates an embodiment of a method for generating video fingerprints for different versions of a video sequence having similar temporal spans.

In some embodiments, the VFR system 200 may modify the video sequence to multiple sets or versions of reference video fingerprints. FIG. 5D is a flow diagram that illustrates such an embodiment of a video fingerprinting method, denoted as video fingerprinting method 516b. It should be understood that, although described in the context of the VFR system 200, the techniques or process described below may be implemented elsewhere, such as in the analysis module 214. The video fingerprinting method 516b comprises generating a first measure (e.g., first video fingerprint) for a first version of a video sequence having finite length (541), dropping pictures to obtain a second version (e.g., second version different than first in number of pictures) of the video sequence of finite length (542), generating a second measure for the second version of the video sequence, the second measure having a similar value to the first measure, wherein the temporal span of the first and second versions are substantially equal (544). The measurements are of similar value in view of the focus on relativity of object transitions. Note that the first and second measures are of similar value if the evaluator method 514a recognizes the first and second measures as a match (e.g., percentage match, versus an identical match). Further, one example where the temporal spans are substantially equal is where the difference to a viewer is imperceptible.

Figure 5E:
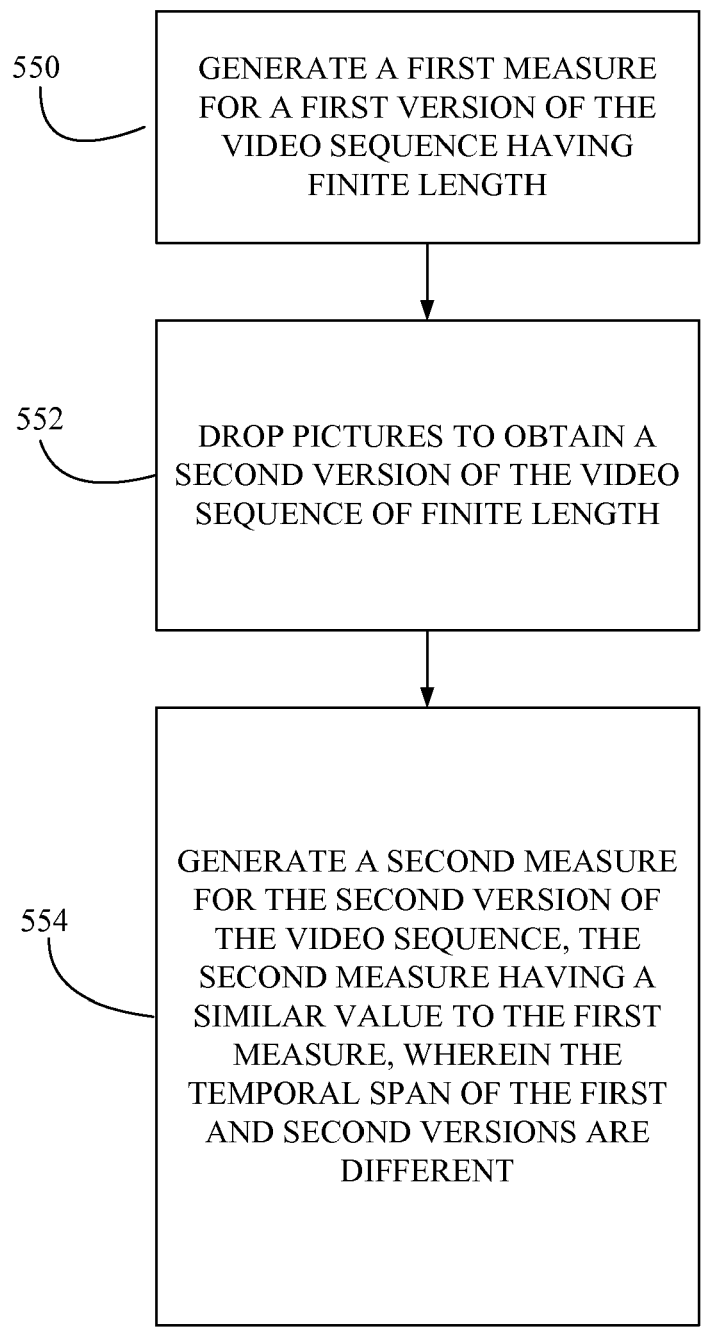
FIG. 5E is a flow diagram that illustrates an embodiment of a method for generating video fingerprints for different versions of a video sequence having different temporal spans.

FIG. 5E is a flow diagram that illustrates a method embodiment, denoted video fingerprinting method 516c, where the temporal spans are different. Accordingly, the video fingerprinting method 516c comprises generating a first measure for a first version of the video sequence having finite length (550), dropping pictures to obtain a second version of the video sequence of finite length (e.g., the second version being different than the first version in number of pictures) (552), generating a second measure for the second version of the video sequence, the second measure having a similar value to the first measure, wherein the temporal span of the first and second versions are different (554).

For instance, the second version may start at a different time than the first version (e.g., start later than the first version), but end at the same time as the first version. Alternatively, the second version may have the same start as the first version but a different end (e.g., earlier than the first version) than the first version. Another example includes where the temporal spans are different and the resolutions are different (e.g., the second version having a smaller picture resolution). For instance, due to the nonlinearity of video data, a scene may appear the same as in a degraded version of the video but the actual numerical representation may be different. Another example includes the case of handling degraded versions, such as where the second version is obtained by decoding the compressed stream that gives rise to the first version and re-encoding the decoded pictures, and then processing of the second version to obtain the video fingerprint (e.g., a measure) that is equal to or approximately equal to the measure of the first version. One having ordinary skill in the art should understand, in the context of the present disclosure, that other alternatives for providing different versions can be implemented, and hence are contemplated to be within the scope of the disclosure.

In some embodiments, the VF system disclosed herein can be implemented in conjunction with other methods, such as watermarking, encrypted tags, etc., where such tags or watermarks can be stored in the database 519 for use in match processing (e.g., as either a primary function or step in the match process, or as a secondary operation to validate the primary process match).

Note that analysis, evaluation, fingerprint generation, and matching described as part of certain embodiments of the VF systems and methods can be implemented in stages of interrogation or monitoring. For instance, a defined percentage of video content that arrives at the video file sharing system 130 can be analyzed, and if a predefined number of matches occur (e.g., indicating the unlawful use of protected content), the percentage of video content subject to these methods may be increased.

Figure 6:
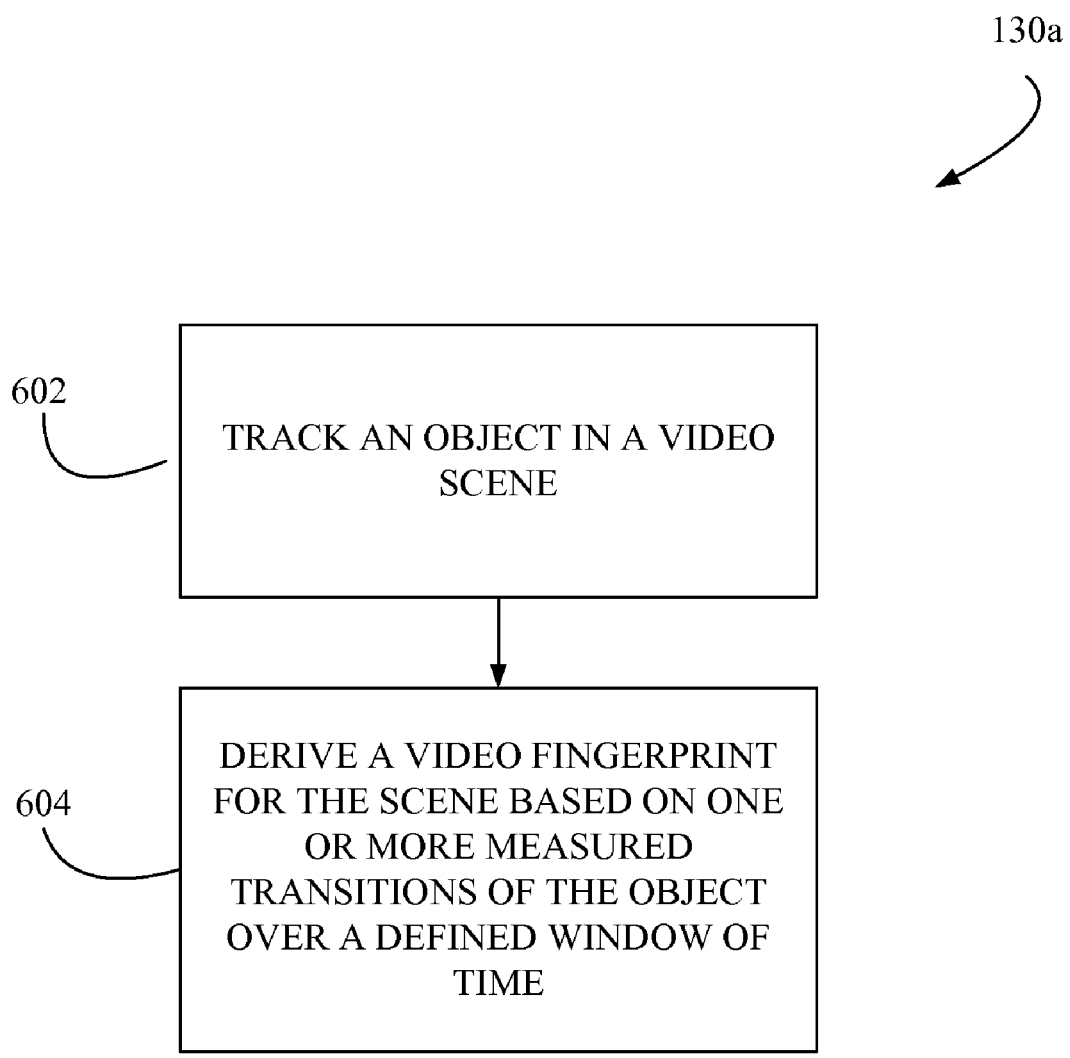
FIG. 6 is a flow diagram that illustrates a method embodiment for generating a video fingerprint.

In view of the above disclosure, it should be appreciated that one method embodiment, denoted method 130a and shown in FIG. 6, comprises tracking an object in a video scene (602) and deriving a video fingerprint for the scene based on one or more measured transitions of the object over a defined window of time (604).

Figure 7:
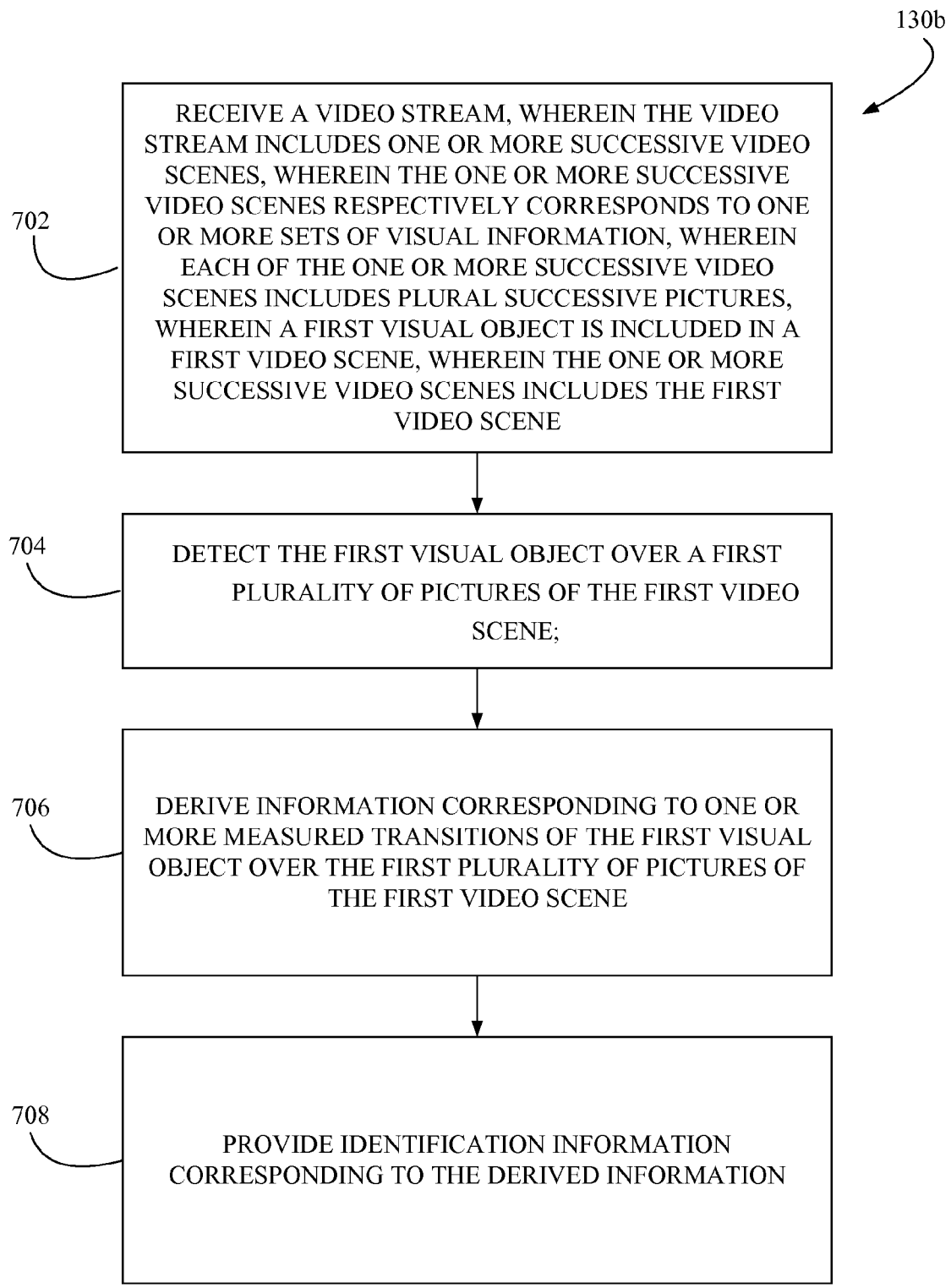
FIG. 7 is a flow diagram that illustrates another method embodiment for generating a video fingerprint.

In view of the above disclosure, it should be appreciated that another method embodiment, denoted method 130b and shown in FIG. 7, comprises receiving a video stream, wherein the video stream includes one or more successive video scenes, wherein the one or more successive video scenes respectively corresponds to one or more sets of visual information, wherein each of the one or more successive video scenes includes plural successive pictures, wherein a first visual object is included in a first video scene, wherein the one or more successive video scenes includes the first video scene (702), detecting the first visual object over a first plurality of pictures of the first video scene (704), deriving information corresponding to one or more measured transitions of the first visual object over the first plurality of pictures of the first video scene (706), and providing identification information corresponding to the derived information (708).

Figure 8:
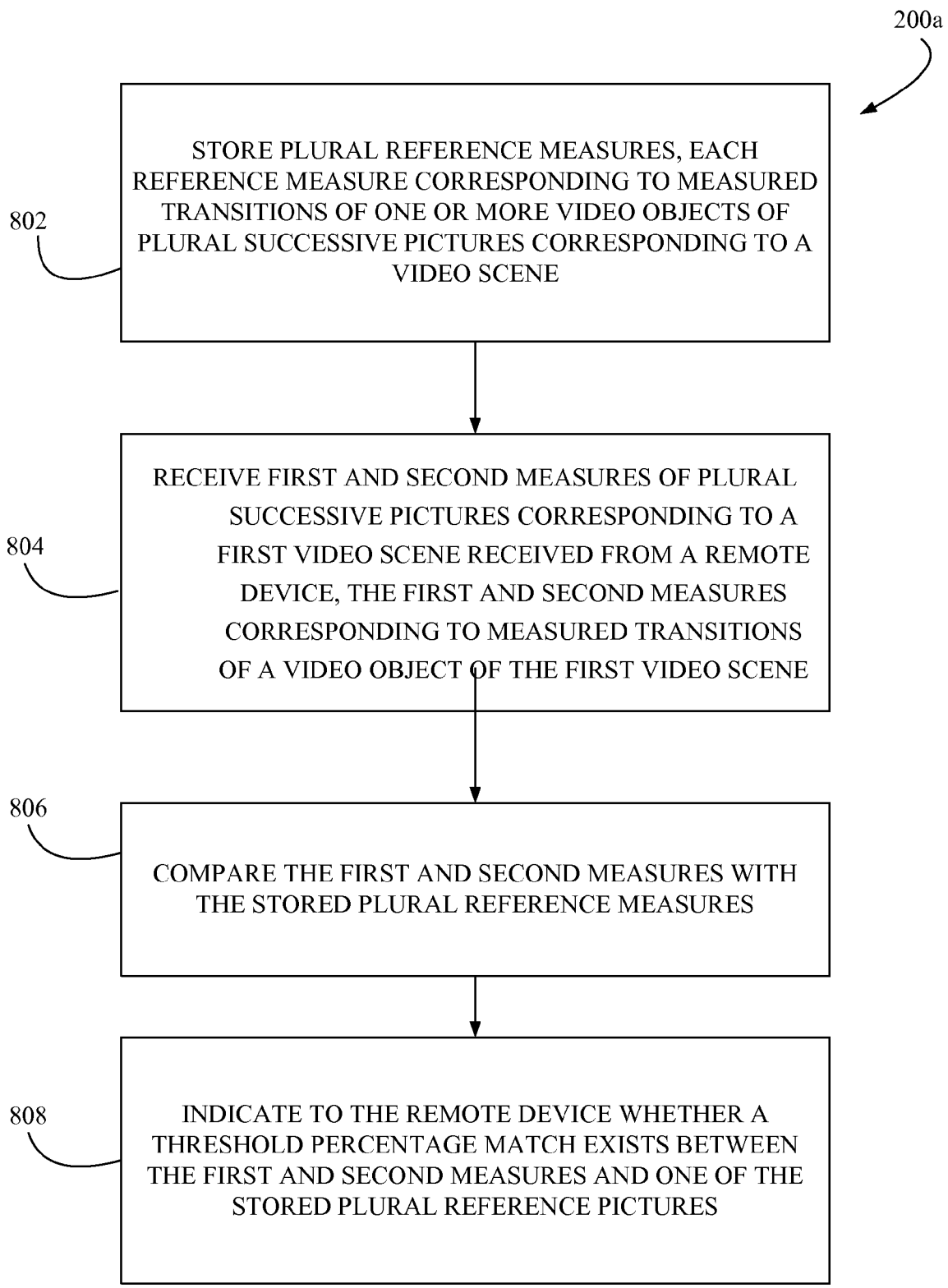
FIG. 8 is a flow diagram that illustrates a method embodiment for matching unknown video content with protected video content.

In view of the above disclosure, it should be appreciated that another method embodiment, denoted method 200a and shown in FIG. 8, comprises storing plural reference measures, each reference measure corresponding to measured transitions of one or more video objects of plural successive pictures corresponding to a video scene (802), receiving first and second measures of plural successive pictures corresponding to a first video scene received from a remote device, the first and second measures corresponding to measured transitions of a video object of the first video scene (804), comparing the first and second measures with the stored plural reference measures (806), and indicating to the remote device whether a threshold percentage match exists between the first and second measures and one of the stored plural reference pictures (808). Note that in some embodiments, comparing further includes determining the existence of a match based on a threshold percentage match less than one hundred percent.

Note that in some embodiments, the VF systems and methods described herein can be extended to processing of native video (e.g., from a video camera, etc.), whereby a native video (compressed or uncompressed) or video characterized as a first representation is received, measurements taken (e.g., on uncompressed or decompressed video), and a second representation is provided as a video stream (e.g., to another device). For instance, the second representation may embody the measurements, or the video content and the measurements. In some embodiments, the second representation is in a compressed format.

The analysis module 214, evaluator module 514, and fingerprinter module 516 and methods 214a, 514a, 516a-516c, 130a, 130b, and 200a of certain embodiments of the present disclosure can be implemented in hardware, software, firmware, or a combination thereof. In embodiments where the analysis module 214, evaluator module 514, and fingerprinter module 516 are implemented in software or firmware (collectively, software code or software logic or simply logic), such embodiments are stored in memory and executed by a suitable instruction execution system. When the analysis module 214, evaluator module 514, and fingerprinter module 516 are implemented in software, it should be noted that the analysis module 214, evaluator module 514, and fingerprinter module 516 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The analysis module 214, evaluator module 514, and fingerprinter module 516 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In embodiments where the analysis module 214, evaluator module 514, and fingerprinter module 516 are implemented in hardware, the analysis module 214, evaluator module 514, and fingerprinter module 516 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 2B and 5B-5E, 6, 7, and 8 using separate boxes can be combined.

In addition, though the various flow diagrams (e.g., shown in FIGS. 2B, 5B-5E, 6, 7, and 8) are shown and described in the context of the architectures shown and described in FIGS. 2A and 5A, it should be understood that implementation of the methods described in FIGS. 2B, 5B-5E, 6, 7, and 8 are not limited to those architectures, and that the same devices or other processing devices possessing different architectures configured to implement such methods are contemplated to be within the scope of the disclosure.

It should be emphasized that the above-described embodiments of the present disclosure are merely possible examples of implementations, merely set forth for a clear understanding of the principles of the VF systems and methods. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for providing identification information for a portion of a video stream, the method comprising:
    receiving a video stream, wherein the video stream includes one or more successive video scenes, wherein the one or more successive video scenes respectively corresponds to one or more sets of visual information, wherein each of the one or more successive video scenes includes plural successive pictures, wherein a first visual object is included in a first video scene, wherein the one or more successive video scenes includes the first video scene;
    detecting the first visual object over a first plurality of pictures of the first video scene;
    deriving information corresponding to one or more measured transitions of the first visual object over the first plurality of pictures of the first video scene, wherein deriving comprises measuring a respective spatial transition from a location of the first visual object in a first picture to a location of the first visual object in each respective picture in a second plurality of pictures, wherein the first picture is included in the first plurality of pictures of the first video scene, wherein the second plurality of pictures includes the first plurality of pictures of the first video scene except the first picture, and wherein each respective picture in the second plurality of pictures is after the first picture in a display order of the first plurality of pictures of the first video scene; and
    providing identification information corresponding to the derived information.

2. The method of claim 1, further comprising associating the identification information with the first video scene.

3. The method of claim 2, further comprising associating the identification information with the first visual object.

4. The method of claim 2, wherein each measured transition of the first visual object is according to a location of a centroid of the first visual object in two pictures of the first video scene.

5. The method of claim 1, wherein the first plurality of pictures of the first video scene comprises all of the plural successive pictures of the first video scene.

6. The method of claim 1, wherein the number of pictures in the first plurality of pictures of the first video scene is less than the number of pictures of the plural successive pictures of the first video scene.

7. The method of claim 1, wherein each measured transition corresponds to changes in one or more of size of the first visual object, shape of the first visual object, color of the first visual object, and hue of the first visual object.

8. The method of claim 1, further comprising: detecting a second visual object over the first plurality of pictures of the first video scene; deriving second information corresponding to one or more measured transitions of the second visual object over the first plurality of pictures of the first video scene; and providing second identification information corresponding to the derived second information.

9. The method of claim 1, further comprising excluding from transition measurement other visual objects which appear for less than a predetermined threshold number of pictures of the first plurality of pictures of the first video scene.

10. The method of claim 1, further comprising excluding from transition measurement other visual objects which appear for less than a predetermined window of time within a span of time of the first plurality of pictures of the first video scene.

11. The method of claim 1, further comprising excluding from transition measurement other visual objects which are of lower priority than the first visual object, the priority based on determined robustness to object detection circumvention.

12. The method of claim 1, further comprising validating the derived information corresponding to the one or more measured transitions of the first visual object over the first plurality of pictures of the first video scene by computing second order measurements of transitions corresponding to the one or more measured transitions.

13. A system that provides identification information for a portion of a video stream, the system comprising:
    a memory having logic stored therein; and a processor configured to execute the logic to: receive a video stream, wherein the video stream includes one or more successive video scenes, wherein the one or more successive video scenes respectively corresponds to one or more sets of visual information, wherein each of the one or more successive video scenes includes plural successive pictures, wherein a first visual object is included in a first video scene, wherein the one or more successive video scenes includes the first video scene;
    detect the first visual object over a first plurality of pictures of the first video scene;
    derive information corresponding to one or more measured transitions of the first visual object over the first plurality of pictures of the first video scene, wherein deriving comprises measuring a respective spatial transition from a location of the first visual object in a first picture to a location of the first visual object in each respective picture in a second plurality of pictures, wherein the first picture is included in the first plurality of pictures of the first video scene, wherein the second plurality of pictures includes the first plurality of pictures of the first video scene except the first picture, and wherein each respective picture in the second plurality of pictures is after the first picture in a display order of the first plurality of pictures of the first video scene; and
    provide identification information corresponding to the derived information.

14. The system of claim 13, wherein the processor is further configured to execute the logic to associate the identification information with the first video scene.

15. The system of claim 14, wherein the processor is further configured to execute the logic to associate the identification information with the first visual object.

16. The system of claim 13, wherein the processor is further configured to execute the logic to measure a spatial transition from a location of the first visual object in a first picture to a location of the first visual object in a second picture, wherein the first and second pictures are included in the first plurality of pictures of the first video scene, and wherein the second picture follows the first picture in display order of the first plurality of pictures of the first video scene.

17. The system of claim 13, wherein the processor is further configured to execute the logic to measure a respective spatial transition from a location of the first visual object in a first picture to a location of the first visual object in each respective picture in a second plurality of pictures, wherein the first picture is included in the first plurality of pictures of the first video scene, wherein the second plurality of pictures includes the first plurality of pictures of the first video scene except the first picture, and wherein each respective picture in the second plurality of pictures is after the first.

18. A system comprising:
   means for receiving a video stream, wherein the video stream includes one or more successive video scenes, wherein each of the one or more successive video scenes includes plural successive pictures, wherein a first visual object is included in a first video scene, wherein the one or more successive video scenes includes the first video scene;
   means for detecting the first visual object over a first plurality of pictures of the first video scene;
   means for deriving information corresponding to one or more measured transitions of the first visual object over the first plurality of pictures of the first video scene, wherein deriving comprises measuring a respective spatial transition from a location of the first visual object in a first picture to a location of the first visual object in each respective picture in a second plurality of pictures, wherein the first picture is included in the first plurality of pictures of the first video scene, wherein the second plurality of pictures includes the first plurality of pictures of the first video scene except the first picture, and wherein each respective picture in the second plurality of pictures is after the first picture in a display order of the first plurality of pictures of the first video scene; and
   means for providing identification information corresponding to the derived information.

* * * * *